(12) United States Patent
Lasky

(10) Patent No.: US 11,131,843 B2
(45) Date of Patent: Sep. 28, 2021

(54) BINOCULAR BRIDGE SYSTEM

(71) Applicant: TNVC, Inc., Redlands, CA (US)

(72) Inventor: Charles Lasky, Port Washington, WI (US)

(73) Assignee: TNVC, Inc., Redlands, CA (US)

( * ) Notice: Subject to any disclaimer, the term of this patent is extended or adjusted under 35 U.S.C. 154(b) by 310 days.

(21) Appl. No.: 16/039,242

(22) Filed: Jul. 18, 2018

(65) Prior Publication Data

US 2019/0025567 A1   Jan. 24, 2019

Related U.S. Application Data

(60) Provisional application No. 62/534,900, filed on Jul. 20, 2017.

(51) Int. Cl.
*G02B 23/00* (2006.01)
*G02B 23/12* (2006.01)
*A42B 3/04* (2006.01)
*G02B 23/18* (2006.01)

(52) U.S. Cl.
CPC ............ *G02B 23/125* (2013.01); *A42B 3/042* (2013.01); *G02B 23/18* (2013.01)

(58) Field of Classification Search
CPC ...... G02B 23/00; G02B 23/12; G02B 23/125; G02B 23/16; G02B 23/2476
USPC .......................... 359/399, 407, 411, 412, 413
See application file for complete search history.

(56) References Cited

U.S. PATENT DOCUMENTS

| 3,985,421 | A | * | 10/1976 | Beecher | G02B 7/06 359/414 |
| 5,703,354 | A | * | 12/1997 | Wannagot | G02B 7/12 250/214 VT |
| 6,463,778 | B1 | * | 10/2002 | Johnston | B21D 39/046 29/237 |
| 6,687,053 | B1 | * | 2/2004 | Holmes | G02B 23/18 2/6.2 |
| 7,049,027 | B2 | * | 5/2006 | Buchanan, Jr. | H01M 50/213 429/100 |
| 8,830,575 | B2 | | 9/2014 | Rivkin et al. | |
| 9,214,656 | B2 | * | 12/2015 | Markgraf | H01M 50/267 |
| 9,507,120 | B1 | | 11/2016 | Bryant et al. | |
| 2004/0244520 | A1 | * | 12/2004 | Cornelius | F16H 25/2252 74/424.92 |
| 2008/0007826 | A1 | * | 1/2008 | Smith | G02B 23/125 359/407 |
| 2012/0200917 | A1 | | 8/2012 | Rivkin et al. | |

(Continued)

*Primary Examiner* — Thong Q Nguyen
(74) *Attorney, Agent, or Firm* — F. Wayne Thompson, Jr.; Asgaard Patent Services, LLC

(57) ABSTRACT

The binocular bridge system is configured to couple two night vision monoculars together, effectively providing the user with a binocular night vision system. An example binocular bridge system comprises a bridge, two hinged arms, and two dummy battery inserts. Each dummy battery insert is configured to be positioned within the battery compartment of a night vision monocular and conductively connect it to a power source housed within the bridge. In some implementation, each hinged arm of the binocular bridge system includes an objective alignment ring. The hinged arms of such a binocular bridge system, in conjunction with the objective alignment rings, are configured to mechanically collimate the night vision monoculars secured thereto.

18 Claims, 13 Drawing Sheets

(56) References Cited

U.S. PATENT DOCUMENTS

2015/0002930 A1 1/2015 Teetzel et al.
2018/0335599 A1* 11/2018 McCreight ............. A42B 3/042

* cited by examiner

BINOCULAR BRIDGE SYSTEM

CROSS REFERENCE TO RELATED APPLICATION

This application claims the benefit of U.S. Provisional Application Ser. No. 62/534,900, which was filed on Jul. 20, 2017, and is incorporated herein by reference in its entirety.

TECHNICAL FIELD

This disclosure relates to implementations of a binocular bridge system.

BACKGROUND

The PVS-14 night vision monocular is in widespread use by warfighters, law enforcement personnel, and the civilian market. The PVS-14 uses a single image intensifier tube that only provides an image to one eye of the user. Cost, size, and weight are key factors that lead to the development and selection of the PVS-14.

Ocular dominance is the brains tendency to prefer receiving visual input from one eye to the other. Naturally, most people have a dominant eye regardless of light conditions. However, the non-dominant eye is still very important since it is used in conjunction with the dominant eye to send more visual input to the brain. Consequently, a person can see with one eye, but their field of vision will be restricted, depth perception compromised, and visual-motor abilities reduced.

When performing tasks that require sight, it is imperative that visual input provided to the brain not be diminished. When performing a task using a night vision monocular, the eye engaged therewith will be the dominant eye. This occurs because the eye viewing the image produced by the night vision monocular is the only eye providing significant visual input to the brain. When a task needs to be completed rapidly, particularly task being performed during a combat operation, speed can be a critical factor to success or failure. This is why special operations teams have been using dual-tube night vision binocular devices for decades. Through the use of two image intensifier tubes, a night vision binocular device provides an image to each eye of the user and facilitates binocular vision. Compared to the monocular vision facilitated by a night vision monocular, the binocular vision facilitated by a night vision binocular device provides for depth perception, increased visual-motor abilities, and a larger field of vision.

Unfortunately, the cost of purchasing purpose built dual-tube night vision binocular devices is prohibitively expensive for many military units, law enforcement agencies, and civilian end users. Therefore, a need exists for a device that can couple two night vision monoculars (e.g., PVS-14s) already in inventory together, effectively providing the user with a dual-tube night vision binocular system.

Accordingly, it can be seen that needs exist for the binocular bridge system disclosed herein. It is to the provision of a binocular bridge system configured to couple two night vision monoculars together, effectively providing the user with a dual-tube night vision binocular system, that the present invention is primary directed.

SUMMARY OF THE INVENTION

Implementations of a binocular bridge system are provided. The binocular bridge system is configured to couple two night vision monoculars together, effectively providing the user with a binocular night vision system. In some implementations, a first night vision monocular and a second night vision monocular can be mounted on a first hinged arm and a second hinged arm, respectively, of the binocular bridge system. In this way, each night vision monocular, via the hinged arm to which it is attached, can be independently positioned by the user. Each hinged arm is configured to move the attached night vision monocular between at least a first position (e.g., deployed in front of the user's eye) and a second position (e.g., stowed or unused). The binocular bridge system is configured to mechanically collimate the two night vision monoculars paired thereby. This may minimize, or eliminate, headaches and disorientation typically associated with the use of night vision systems comprising two non-aligned image intensifier tubes. The binocular bridge system is configured to simultaneously power, and control the operation of (i.e., turn on/off), the two night vision monoculars mounted thereon.

An example binocular bridge system comprises: a bridge; a power source housed within the bridge; a first hinged arm, a proximal end of the first hinged arm is secured to a first side of the bridge; a second hinged arm, a proximal end of the second hinged arm is secured to a second side of the bridge; a first dummy battery insert comprising an elongate shaft, a negative that encircles a portion of the elongate shaft, and a positive contact located a an end of the elongate shaft; and a second dummy battery insert comprising an elongate shaft, a negative contact that encircles a portion of the elongate shaft, and positive contact located at an end of the elongate shaft. The first dummy battery insert is configured to be positioned within a battery compartment of a night vision monocular secured to the first hinged arm and conductively connect it to the power source housed within the bridge; the second dummy battery insert is configured to be positioned within a battery compartment of a night vision monocular secured to the second hinged arm and conductively connect it to the power source housed within the bridge.

Another example binocular bridge system comprises: a bridge; a power source housed within the bridge; a first hinged arm, a proximal end of the first hinged arm is secured to a first side of the bridge, the first hinged arm includes an objective alignment ring configured to fit around an objective lens locking ring of a first night vision monocular secured to the first hinged arm; a second hinged arm, a proximal end of the second hinged arm is secured to a second side of the bridge, the second hinged arm includes an objective alignment ring configured to fit around an objective lens locking ring of a second night vision monocular secured to the second hinged arm; a first dummy battery insert configured to be positioned within the battery compartment of the first night vision monocular and conductively connect it to the power source housed within the bridge, the first dummy battery insert comprising an elongate shaft, a negative contact that encircles a portion of the elongate shaft, a positive contact located at an end of the elongate shaft, and a rotating cap configured to threadedly secure the first dummy battery insert to the battery compartment of the first night vision monocular; and a second dummy battery insert configured to be positioned within a battery compartment of the second night vision monocular and conductively connect it to the power source housed within the bridge, the second dummy battery insert comprising an elongate shaft, a negative contact that encircles a portion of the elongate shaft, a positive contact located at an end of the elongate shaft, and a rotating cap configured to threadedly secure the second dummy battery insert to the battery compartment of the second night vision monocular. The objective alignment rings of the first hinged arm and the second hinged arm are configured to mechanically collimate the night vision monoculars secured to the first hinged arm and the second hinged arm of the binocular bridge system.

BRIEF DESCRIPTION OF THE DRAWINGS

Like reference numerals refer to corresponding parts throughout the several views of the drawings.

DETAILED DESCRIPTION

Figure 1A:
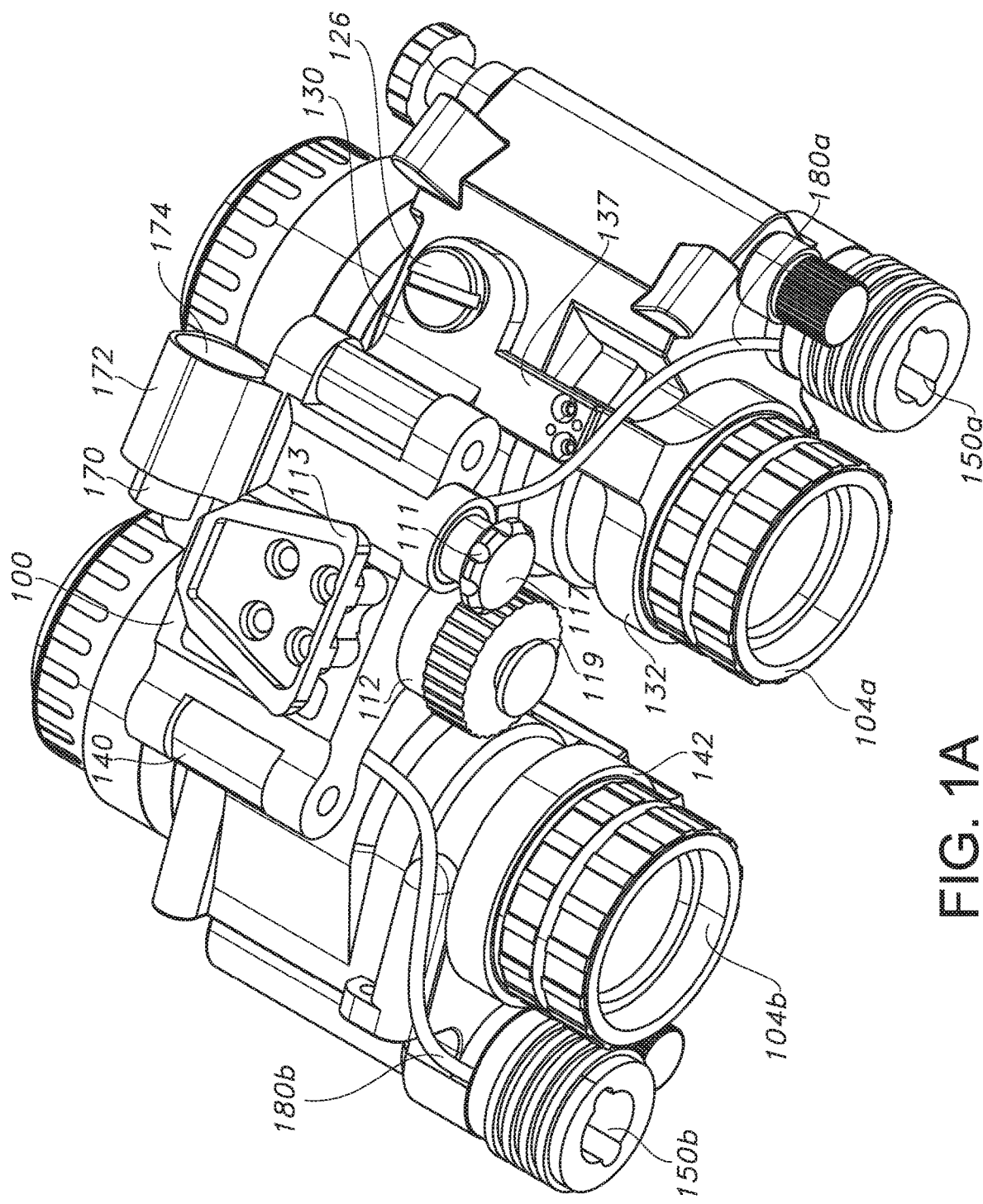
FIG. 1A illustrates an isometric top, front, right view of the binocular bridge system according to the principles of the present disclosure, wherein a night vision monocular is secured to each hinged arm thereof.

FIGS. 1A-1D, and 2A-2C illustrate an example binocular bridge system 100 according to the principles of the present disclosure. The binocular bridge system 100 is configured to couple two night vision monoculars 104a, 104b together, effectively providing the user with a dual-tube night vision binocular system. In some implementations, the binocular bridge system 100 may be secured to a helmet, thereby positioning a first night vision monocular 104a and a second night vision monocular 104b on the head of a user. In some implementations, the first night vision monocular 104a and the second night vision monocular 104b may be mounted on a first hinged arm 130 and a second hinged arm 140, respectively, of the binocular bridge system 100 (see, e.g., FIGS. 1A and 1B). In this way, each night vision monocular 104a, 104b, via the hinged arm 130, 140 to which it is attached, can be independently positioned by the user. In some implementations, each hinged arm 130, 140 may be configured to move the attached night vision monocular 104a, 104b between at least a first position (e.g., deployed in front of the user's eye) and a second position (e.g., stowed or unused). In some implementations, the binocular bridge system 100 may be configured to simultaneously power, and control the operation of (i.e., turn on/off), the two night vision monoculars 104a, 104b mounted thereon.

Figure 2A:
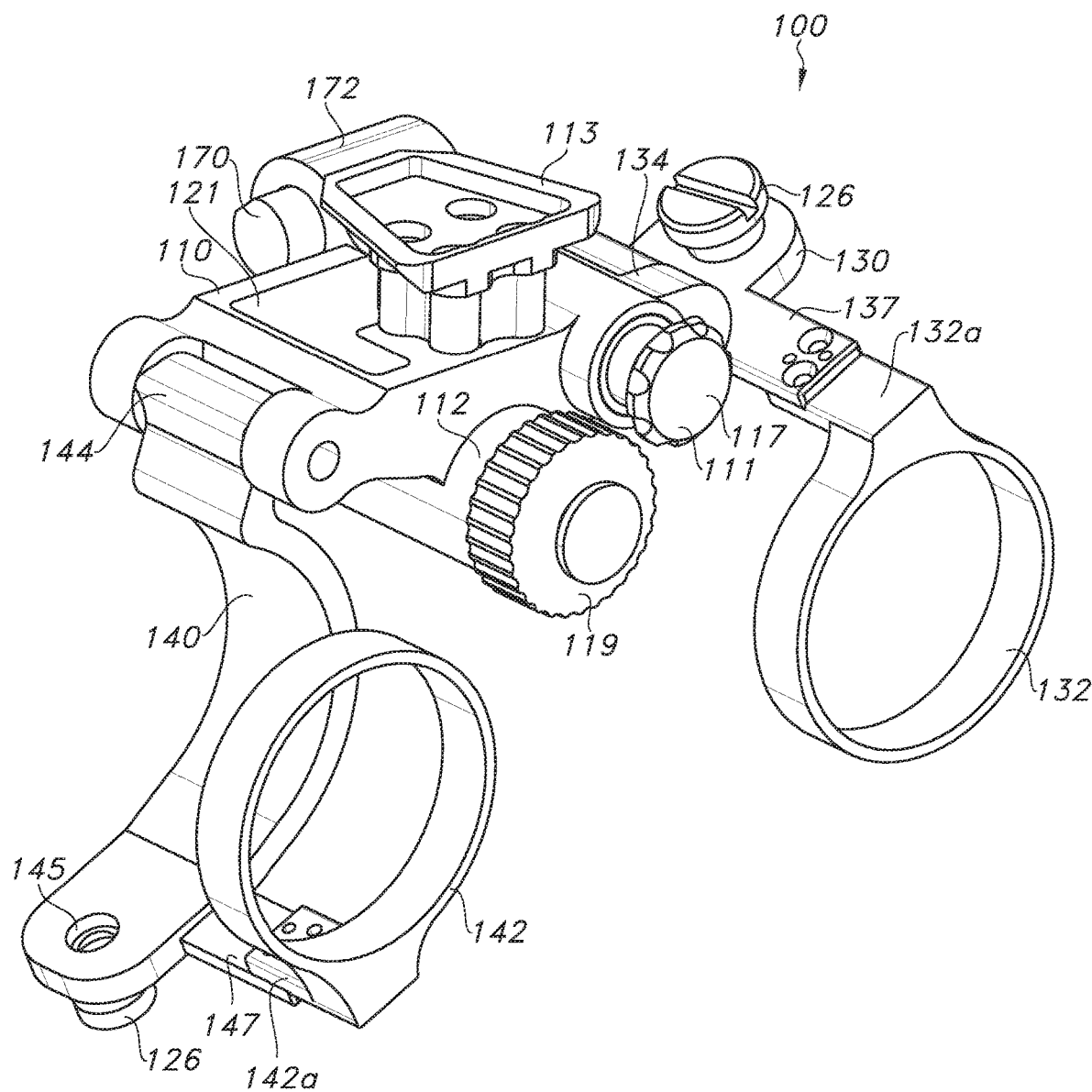
FIG. 2A illustrates an isometric top, front, left view of the binocular bridge system according to the principles of the present disclosure, wherein the dummy battery inserts and the conductive cables have been omitted for clarity.
Figure 2B:
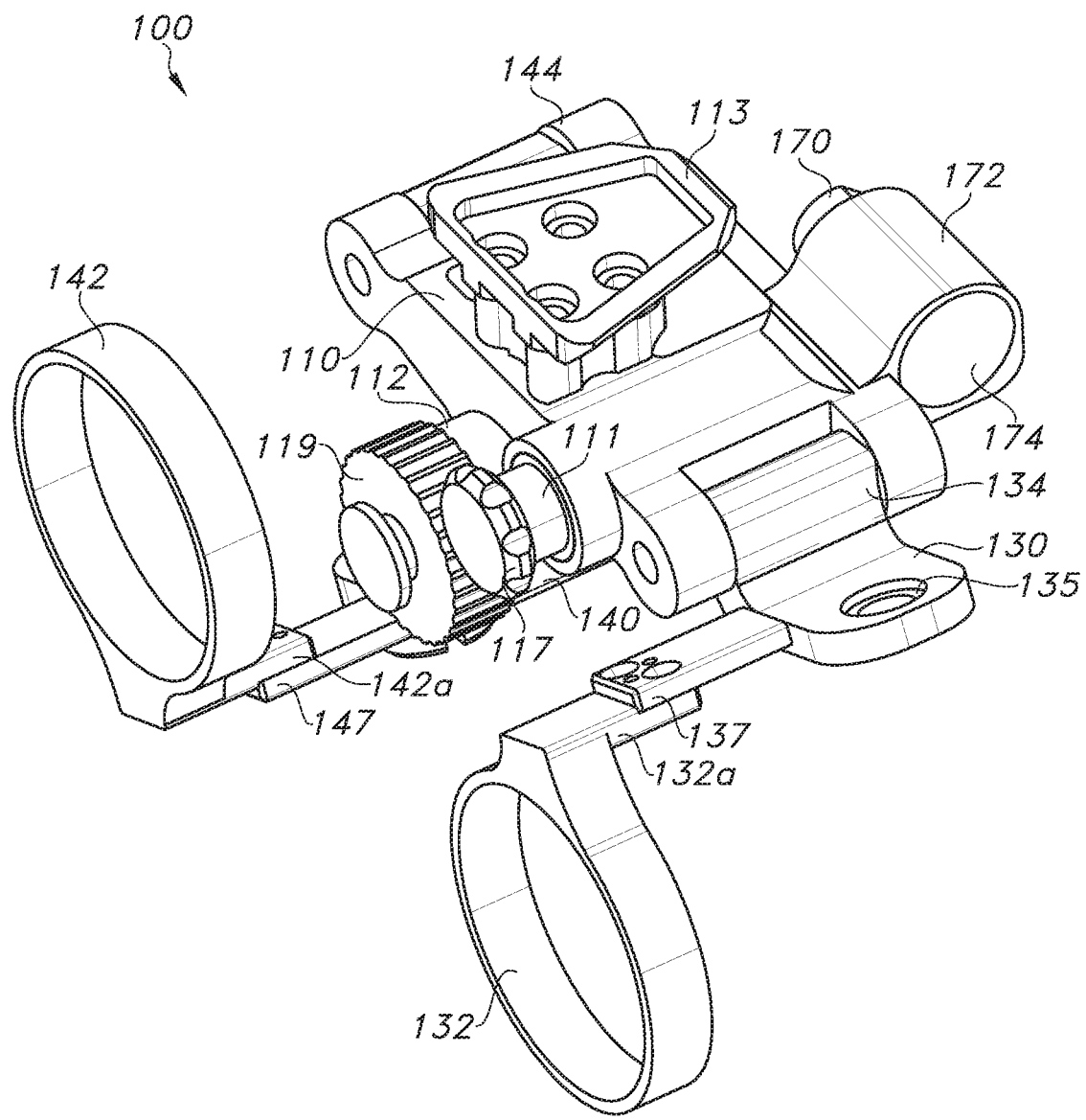
FIG. 2B illustrates an isometric top, front, right view of the binocular bridge system shown in FIG. 2A.
Figure 2C:
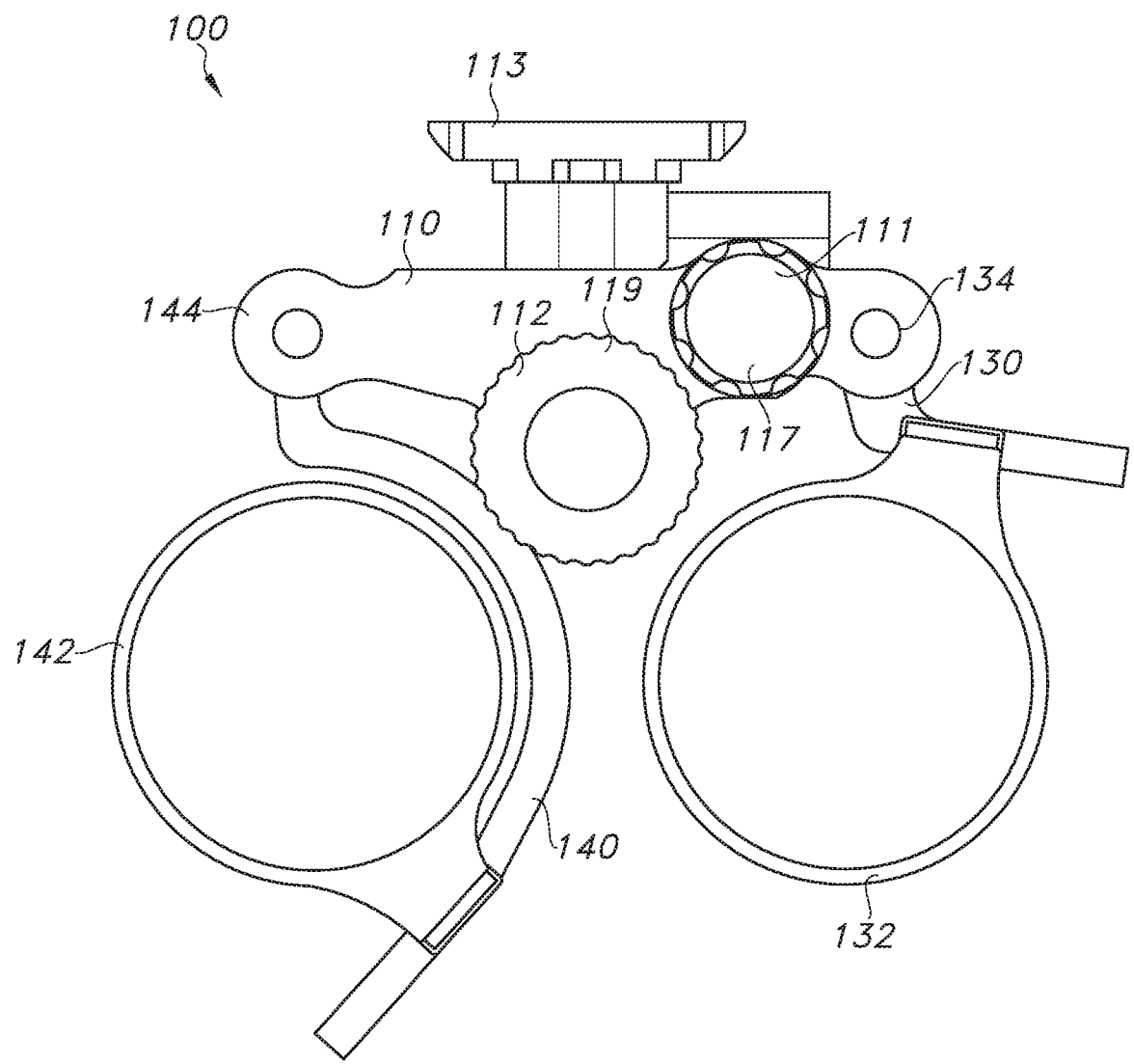
FIG. 2C illustrates a front view of the binocular bridge system shown in FIG. 2A.

As shown in FIGS. 2A-2C, in some implementations, the binocular bridge system 100 may comprise a bridge 110, a first hinged arm 130 having an objective alignment ring 132 thereon, a second hinged arm 140 having an objective alignment ring thereon 142, and two dummy battery inserts 150a, 150b. Each dummy battery insert 150a, 150b is configured to be positioned within the battery compartment of a night vision monocular 104a, 104b and conductively connect it to a power source (e.g., a battery) housed within the bridge 110. In some implementations, the binocular bridge system 100 may further comprise a remotely positioned battery pack that may be conductively connected to the bridge 110 via a cable.

As shown in FIGS. 2A-2C and 3, in some implementations, the bridge 110 of the binocular bridge system 100 may comprise a master control switch 111 (e.g., an on/off switch), a battery storage compartment 112, an interface shoe 113 (e.g., a dovetail interface) configured to connect the system 100 to a helmet mount, and/or an interior compartment 120 containing a printed circuit board 122 (PCB).

Figure 1B:
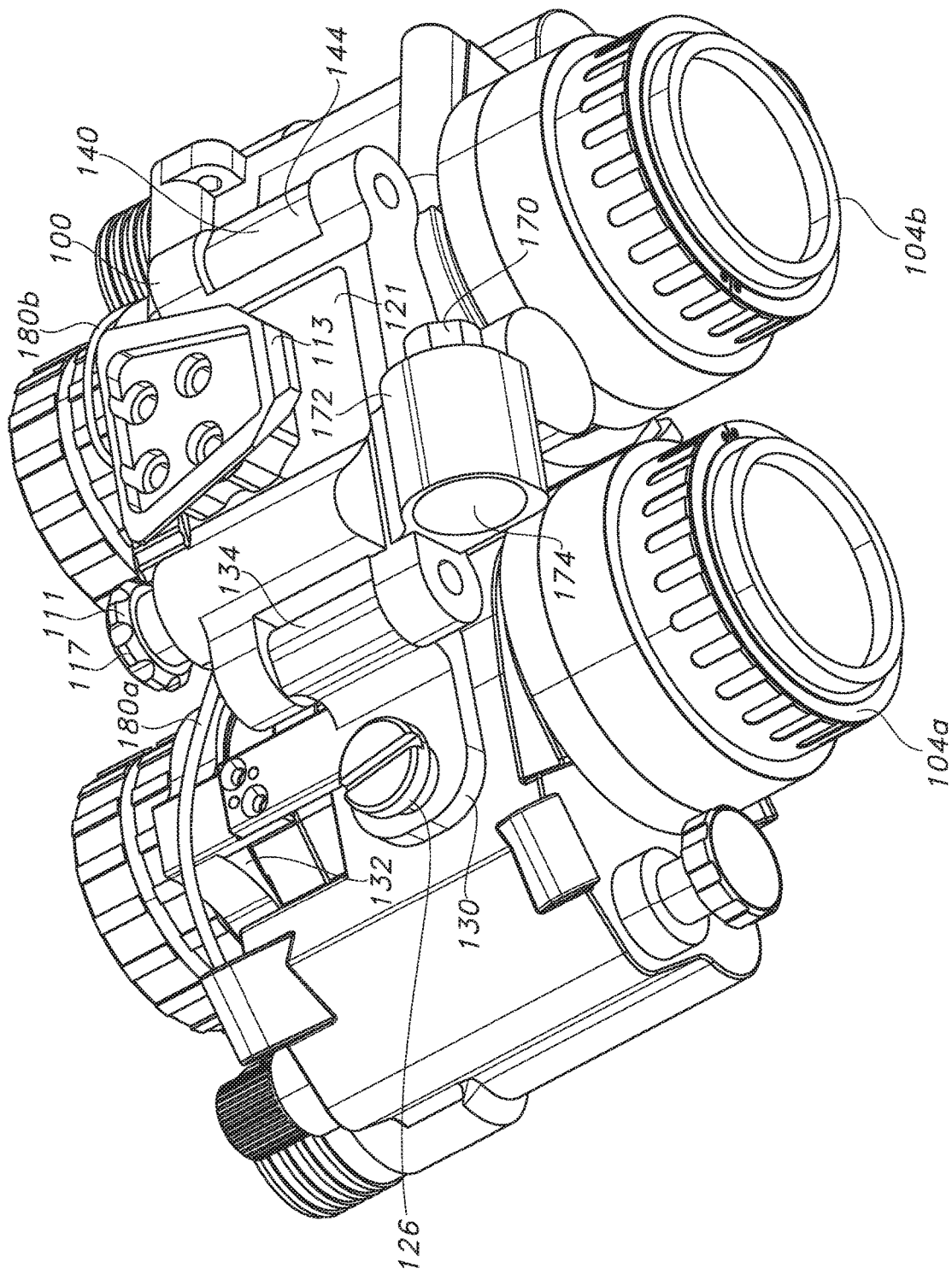
FIG. 1B illustrates an isometric top, back, left view of the binocular bridge system shown in FIG. 1A.

As shown in FIGS. 1A and 1B, in some implementations, the master control switch 111 may be configured to act as an on/off switch for both night vision monoculars 104a, 104b conductively connected thereto via the dummy battery inserts 150a, 150b.

Figure 1C:
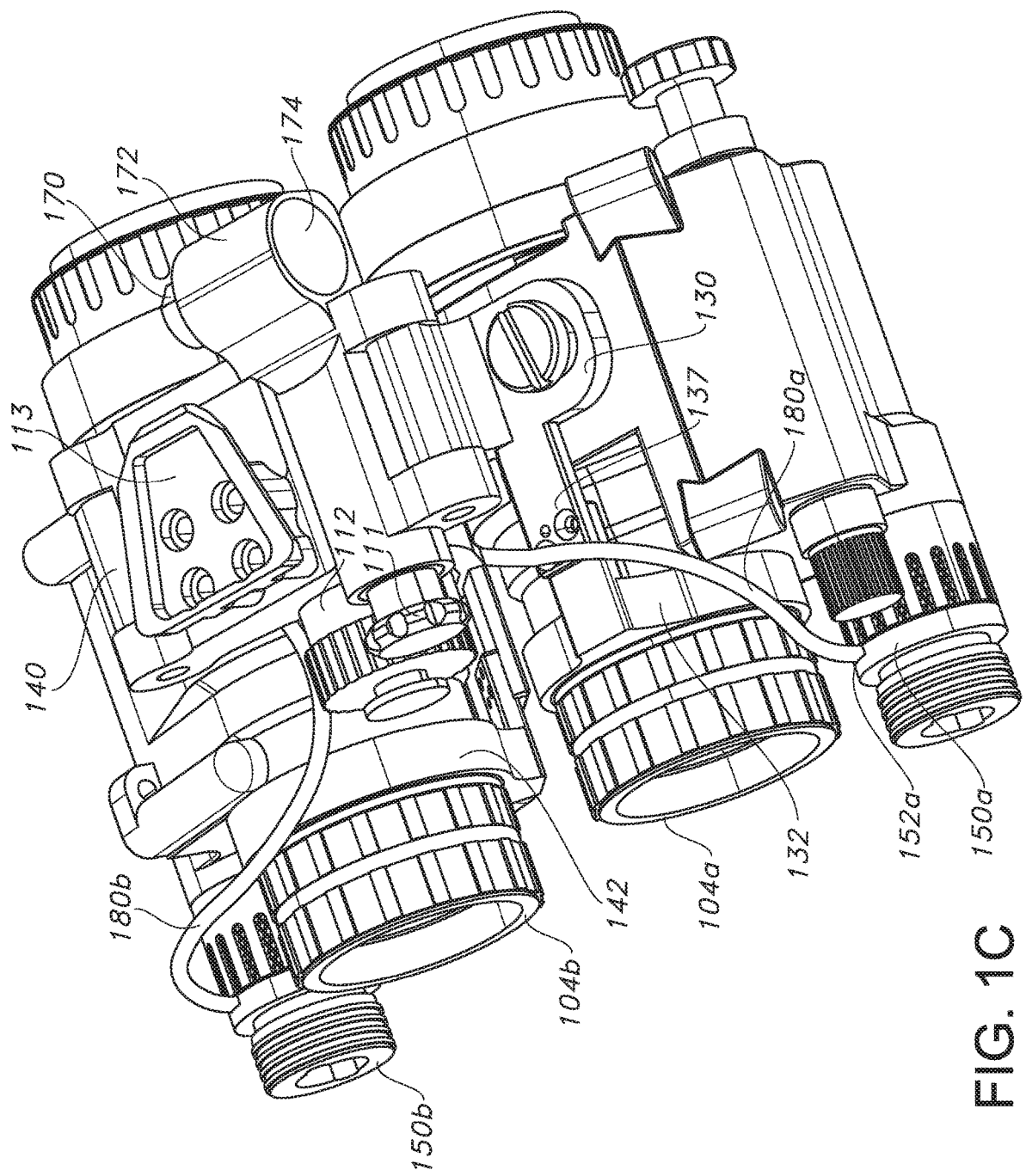
FIG. 1C illustrates an isometric top, front, left view of the binocular bridge system shown in FIG. 1A.
Figure 1D:
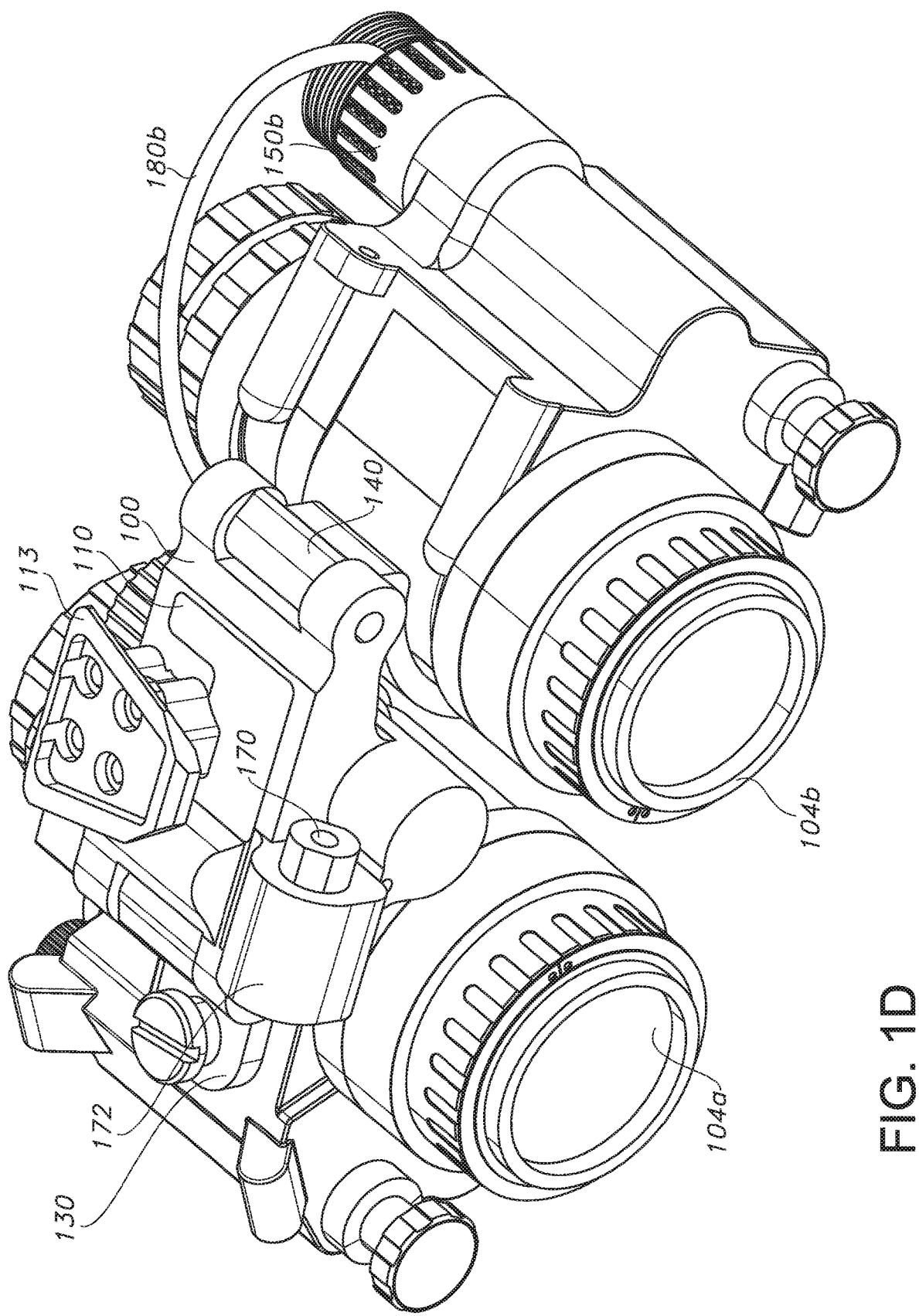
FIG. 1D illustrates an isometric top, back, right view of the binocular bridge system shown in FIG. 1A.
Figure 1E:
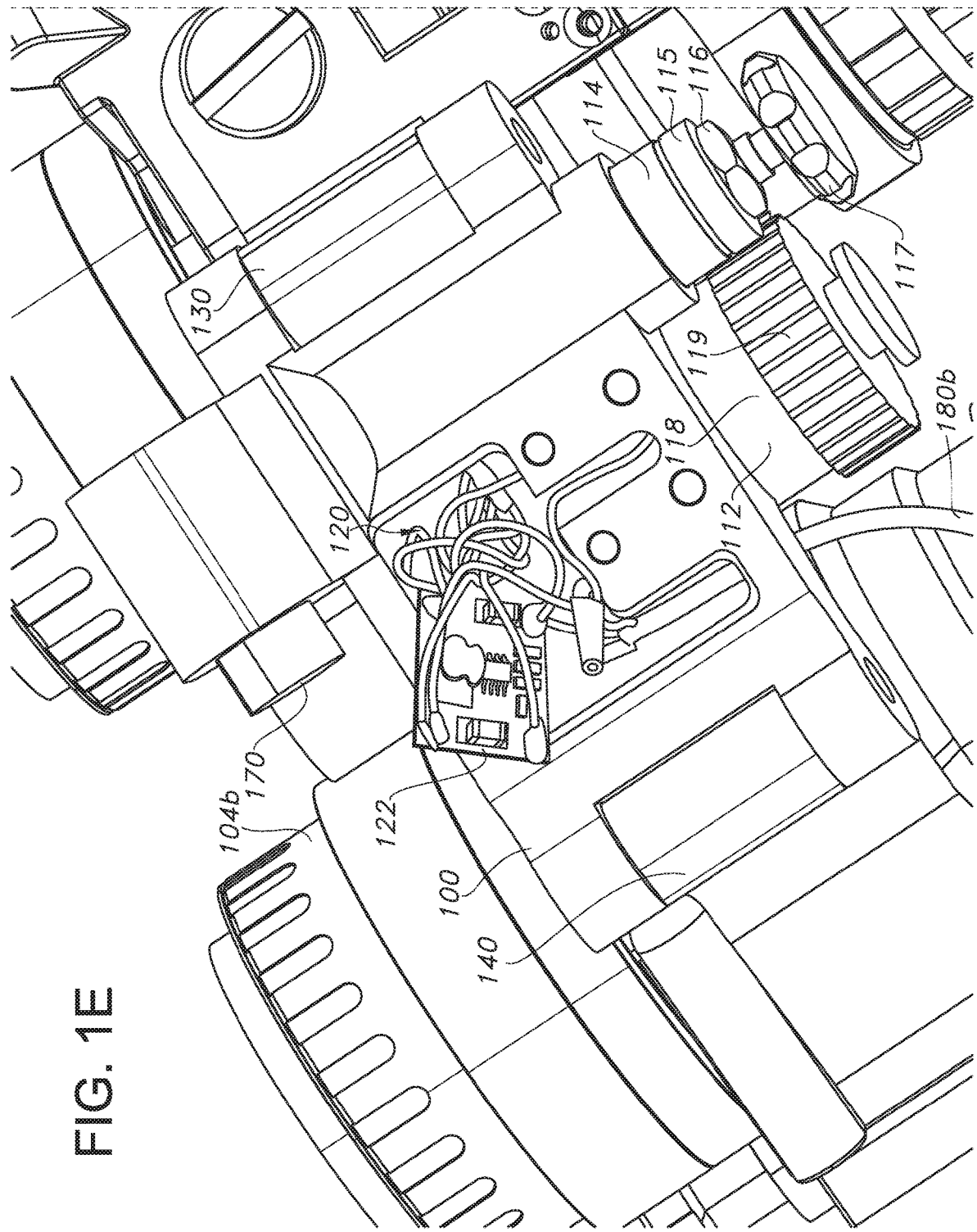
FIG. 1E illustrates a top view of the binocular bridge system shown in FIG. 1A, wherein the plate enclosing the interior compartment of the bridge has been removed thereby exposing the PCB.
Figure 3:
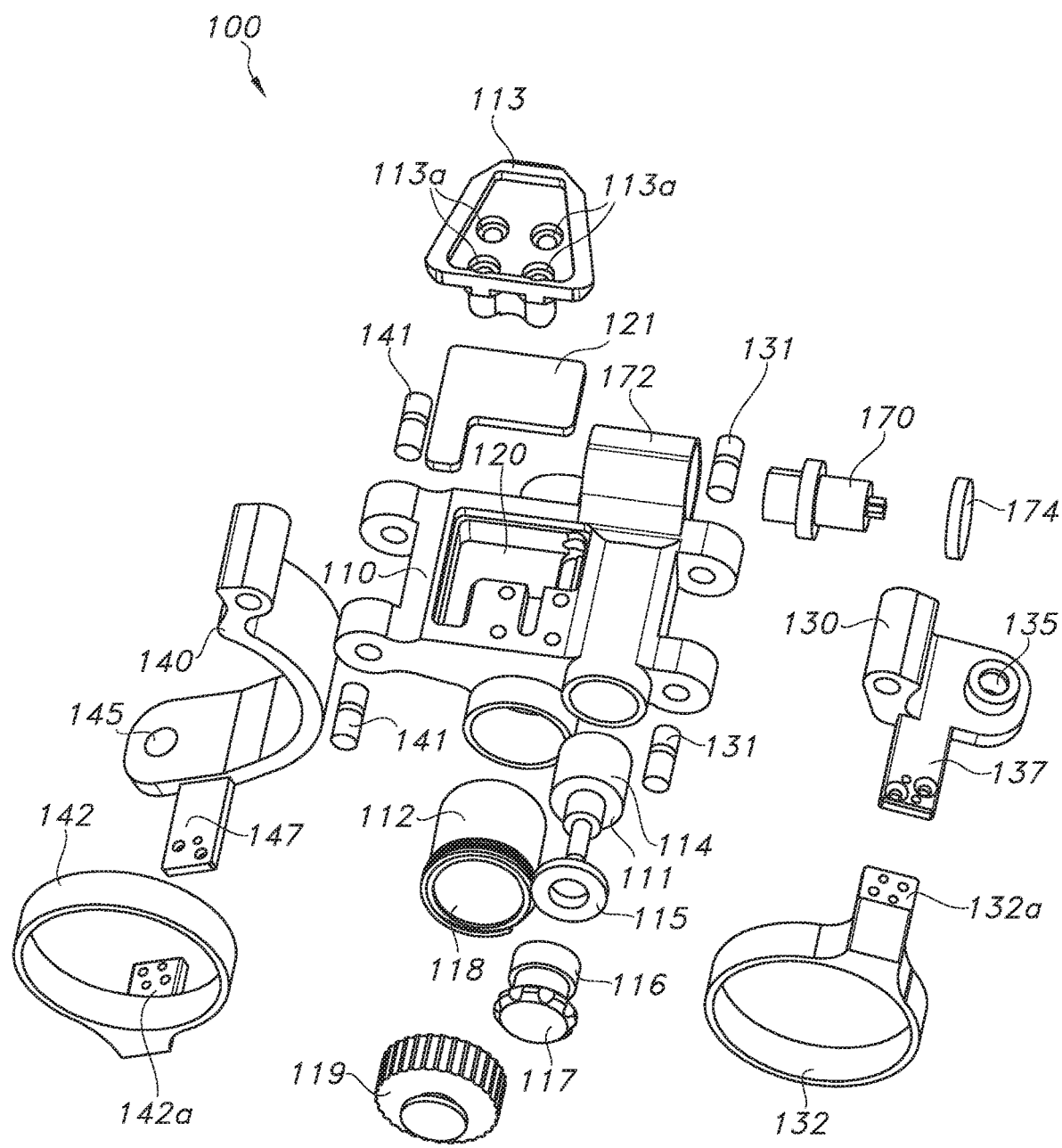
FIG. 3 illustrates an exploded isometric view of the binocular bridge system shown in FIG. 2A, wherein the fasteners have been omitted for clarity.

As shown in FIGS. 1E and 3, the master control switch 111 may comprise a switch 114, a washer 115, a threaded nut 116, and a knob 117. In some implementations, the washer 115 may be larger in diameter than the switch 114. In some implementations, the threaded nut 116 may be threadedly secured to a portion of the switch 114 and used to secure the washer 115 against the face of the switch 114 (see, e.g., FIG. 1E). In some implementations, the knob 117 may be operably connected to the rotating shaft of the mechanical switch 114 (see, e.g., FIG. 1E). In some implementations, an assembly comprised of the mechanical switch 114, the washer 115, and/or the threaded nut 116 may be coated in an adhesive (e.g., silicone) and positioned within an opening in the bridge 110 (see, e.g., FIG. 1E). In this way, the master control switch 111 may be secured within the opening in the bridge 110. In some implementations, the knob 117 may be configured to rotate the shaft of the mechanical switch 114 between at least a first position (e.g., an "on" position) and a second position (e.g., an "off" position). In this way, the knob 117, and thereby the mechanical switch 114, may be used to selectively energize (i.e., turn on/off) the night vision monoculars 104a, 104b conductively connected thereto via the dummy battery inserts 150a, 150b.

In some implementations, the washer 115 of the master control switch 111 may not be larger in diameter than the switch 114.

As shown in FIG. 3, in some implementations, the battery storage compartment 112 of the bridge 110 may be configured to hold one or more batteries therein. In some implementations, the power source(s) contained within the battery storage compartment 112 may be conductively connected to both dummy battery inserts 150a, 150b via the master control switch 111. In this way, the master control switch 111 may be used to selectively energize the conductively connected night vision monoculars 104a, 104b simultaneously.

As shown in FIG. 3, in some implementations, the battery storage compartment 112 may comprise a battery housing 118 and a battery cap 119. In some implementations, the battery housing 118 may be positioned within an opening in the bridge 110. In some implementations, the battery housing 118 may be configured to contain one or more batteries therein. In some implementations, the battery cap 119 may be configured to threadedly secured to the open end of the battery housing 118. In this way, one or more batteries may be retained within the battery housing 118.

As shown in FIG. 1C, in some implementations, the interface shoe 113 may be removable connected to the bridge 110 by one or more fasteners. In some implementations, a fastener may be inserted through each opening 113a extending through the interface shoe 113 and threadedly received within a corresponding threaded opening in the bridge 110 (see, e.g., FIG. 3). In this way, the interface shoe 113 may be removably connected to the bridge 110 of the binocular bridge system 100.

As shown in FIGS. 1B and 3, in some implementations, the interior compartment 120 of the bridge 110 may be enclosed by a plate 121. In this way, the PCB 122 contained therein may be protected from the environment (e.g., water).

In some implementations, the PCB 122 may comprise a voltage divider 124 configured to provide an output voltage to the conductively connected night vision monoculars 104a, 104b that is a fraction of the input voltage provided by the power source (e.g., one or more batteries) contained in the battery storage compartment 112. In some implementations, the PCB 122 may be conductively connected to the power source contained in the battery storage compartment 112 and the dummy battery inserts 150a, 150b. In this way, the PCB 122 is able to provide an output voltage (i.e., power) to the attached night vision monoculars 104a, 104b.

As shown in FIGS. 1A and 1B, the first hinged arm 130 and the second hinged arm 140 may be configured so that the first night vision monocular 104a and the second night vision monocular 104b, respectively, may be removably secured thereto by a threaded fastener 126 (e.g., a screw). In some implementations, the objective alignment ring 132 of the first hinged arm 130 and the objective alignment ring 142 of the second hinged arm 140 may be configured to fit about the objective lens locking ring of an attached night vision monocular 104a, 104b (see, e.g., FIG. 1C). In this way, the front end of the attached night vision monocular 104a, 104b may be supported. Also, in some implementations, the objective alignment rings 132, 142 may be configured to position (i.e., mechanically collimate) the monoculars 104a, 104b so that the objective lenses thereof are in alignment (i.e., parallel) with each other (see, e.g., FIGS. 1C and 2C).

As shown in FIGS. 1A and 2B, the first hinged arm 130 may be coupled to the bridge 110 by a hinge 134. In this way, the first arm 130 may be moved (or swing) between at least a first position and a second position. In some implementations, the proximal end of the first hinged arm 130 may be coupled to the bridge 110 by two pivot pins 131.

As shown in FIG. 2B, in some implementations, the first hinged arm 130 may include an opening 135 near the distal end thereof for a threaded fastener 126 to extend through. In some implementations, the threaded fastener 126 (e.g., a flat head screw) may be inserted through the opening 135 of the first hinged arm 130 and screwed into the threaded hole in the housing of the first night vision monocular 104a (see, e.g., FIG. 1C). In this way, the night vision monocular 104a may be secured to the first hinged arm 130 of the binocular bridge system 100.

As shown in FIGS. 2B and 3, in some implementations, the objective alignment ring 132 extends from the first hinged arm 130 of the binocular bridge system 100. In some implementations, the objective alignment ring 132 includes an arm member 132a that extends therefrom configured to be removably secured by, one or more, threaded fasteners to an arm member 137 extending from a portion of the first hinged arm 130. In some implementations, the arm member 132a of the objective alignment ring 132 and the arm member 137 of the first hinged arm 130 may be secured together in an overlapping fashion as shown in FIGS. 2A and 2B. In some implementations, the underside of the arm member 132a extending from the objective alignment ring 132 may include an abutment 139 against which the front end of the arm member 137 extending from the first hinged arm 130 rest.

As shown in FIGS. 1A and 2A, the second hinged arm 140 may be coupled to the bridge 110 by a hinge 144. In this way, the second hinged arm 140 may be moved (or swing) between at least a first position and a second position. In some implementations, the proximal end of the second hinged arm 140 may be coupled to the bridge 110 by two pivot pins 141 (see, e.g., FIG. 3). In some implementations, the second hinged arm 140 may be configured to contour about the housing of a night vision monocular 104b (see, e.g., FIG. 2C).

As shown in FIGS. 2A and 3, in some implementations, the second hinged arm 140 may include an opening 145 near the distal end thereof for a threaded fastener 126 to extend through. In some implementations, the threaded fastener 126 (e.g., a flat head screw) may be inserted through the opening 145 of the second hinged arm 140 and screwed into the threaded hole in the housing of the second night vision monocular 104b. In this way, the night monocular 104b may be secured to the second hinged arm 140 of the binocular bridge system 100.

As shown in FIGS. 2A and 3, in some implementations, the objective alignment ring 142 extends from the second hinged arm 140 of the binocular bridge system 100. In some implementations, the objective alignment ring 142 includes an arm member 142a that extends therefrom configured to be removably secured by, one or more, threaded fasteners to an arm member 147 extending from a portion of the second hinged arm 140. In some implementations, the arm member 142a of the objective alignment ring 142 and the arm member 147 of the second hinged arm 140 may be secured together in an overlapping fashion as shown in FIG. 2A. In some implementations, the underside of the arm member 142a extending from the objective alignment ring 142 may include an abutment 149 against which the front end of the arm member 147 extending from the second hinged arm 140 rest.

As shown in FIG. 1A, in some implementations, the first dummy battery insert 150a and the second dummy battery insert 150b may be configured to conductively connect the first night vision monocular 104a and the second night vision monocular 104b, respectively, to the master control switch 111, battery storage compartment, and/or the PCB 122 stored in the interior compartment 120 of the bridge 110. In some implementations, a first conductive cable 180a and a second conductive cable 180b may be used to conductively connect the first dummy battery insert 150a and the second dummy battery insert 150b, respectively, to the master control switch 111, the battery storage compartment 112, and/or the PCB 122 stored in the interior compartment 120 of the bridge 110 (see, e.g., FIG. 1C).

Figure 4A:
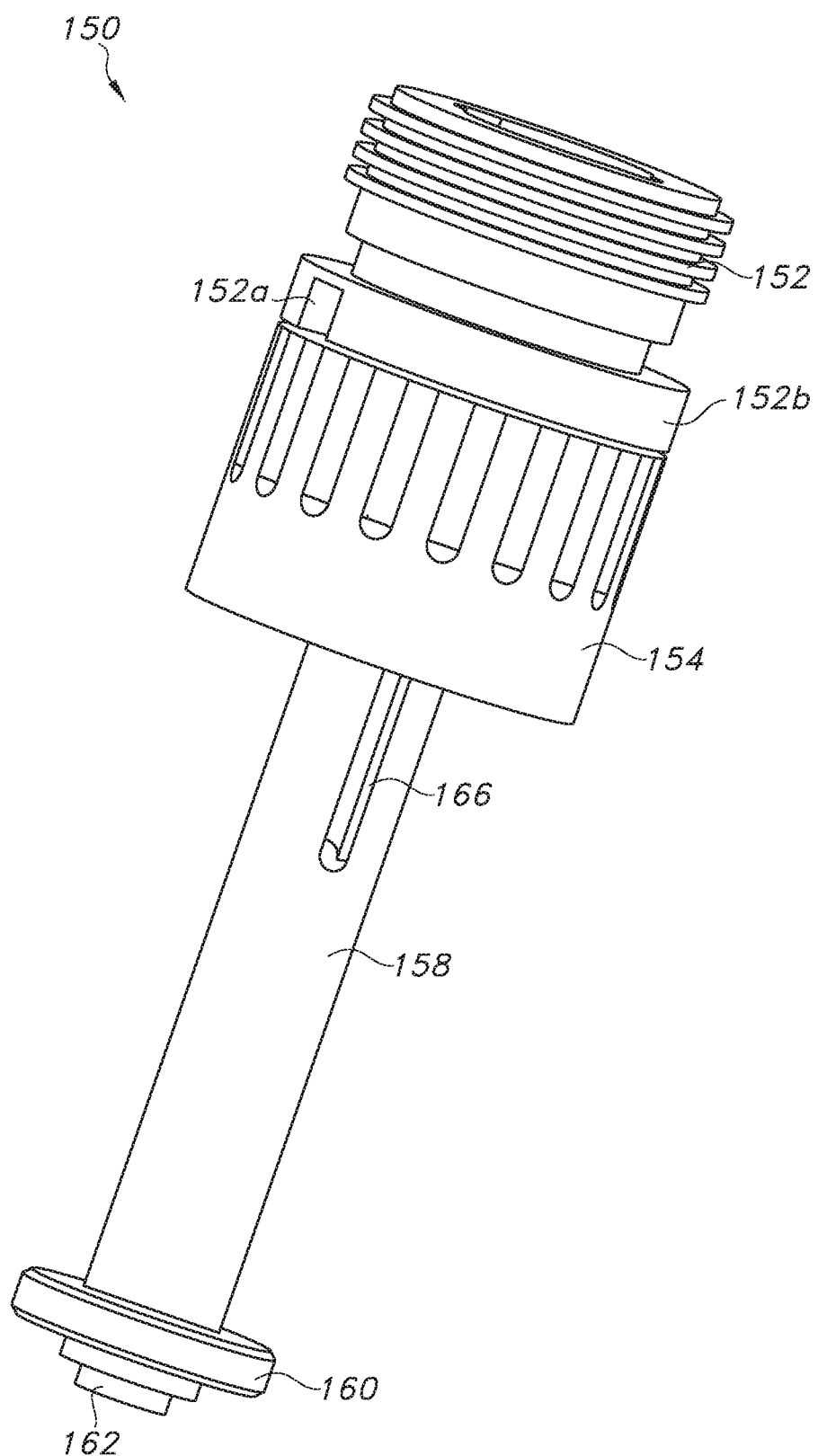
FIG. 4A illustrates an isometric right view of a dummy battery insert according to the principles of the present disclosure, wherein the conductive cable has been omitted for clarity.
Figure 4B:
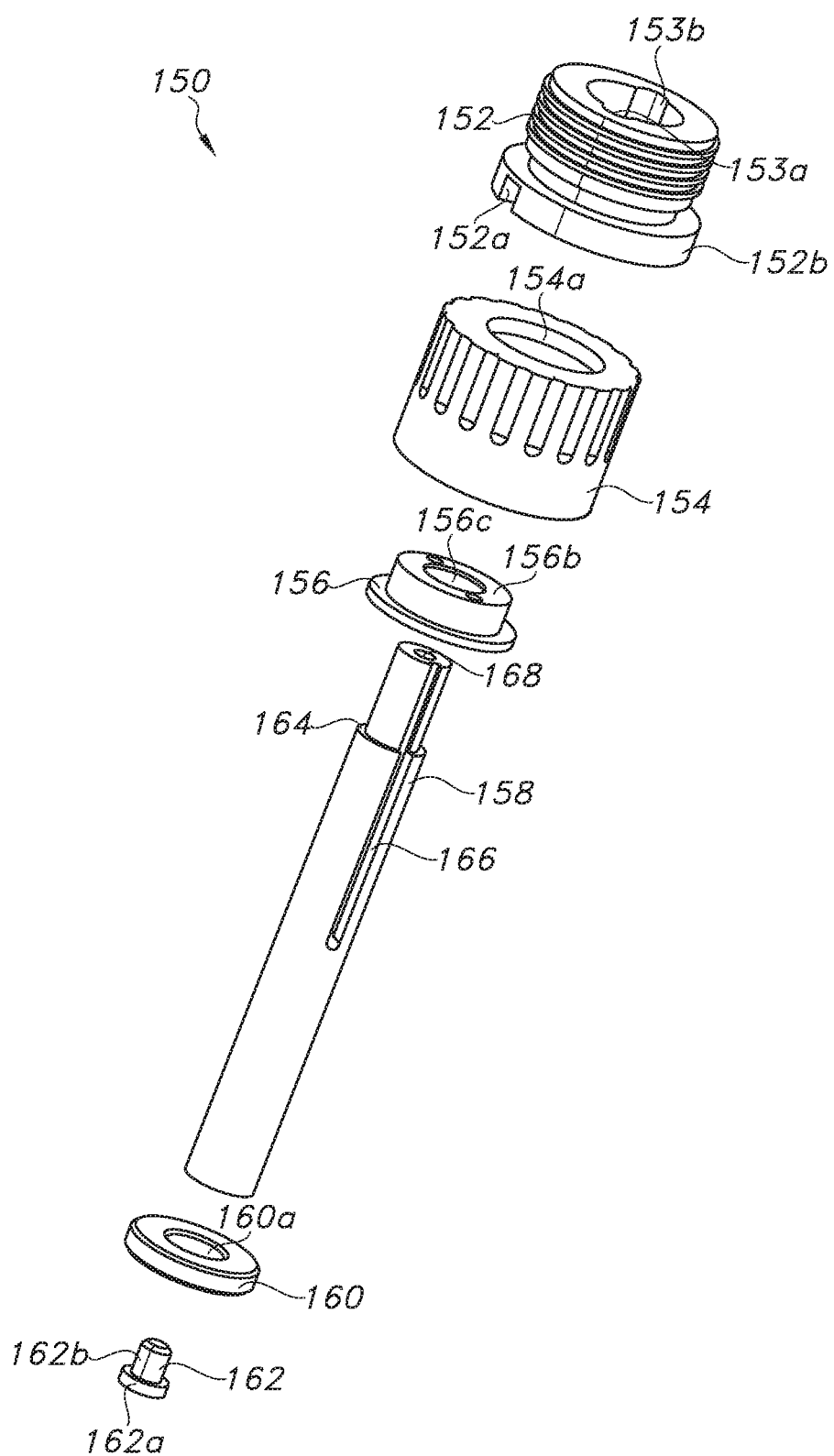
FIG. 4B illustrates an exploded view of the dummy battery insert shown in FIG. 4A.
Figure 4C:
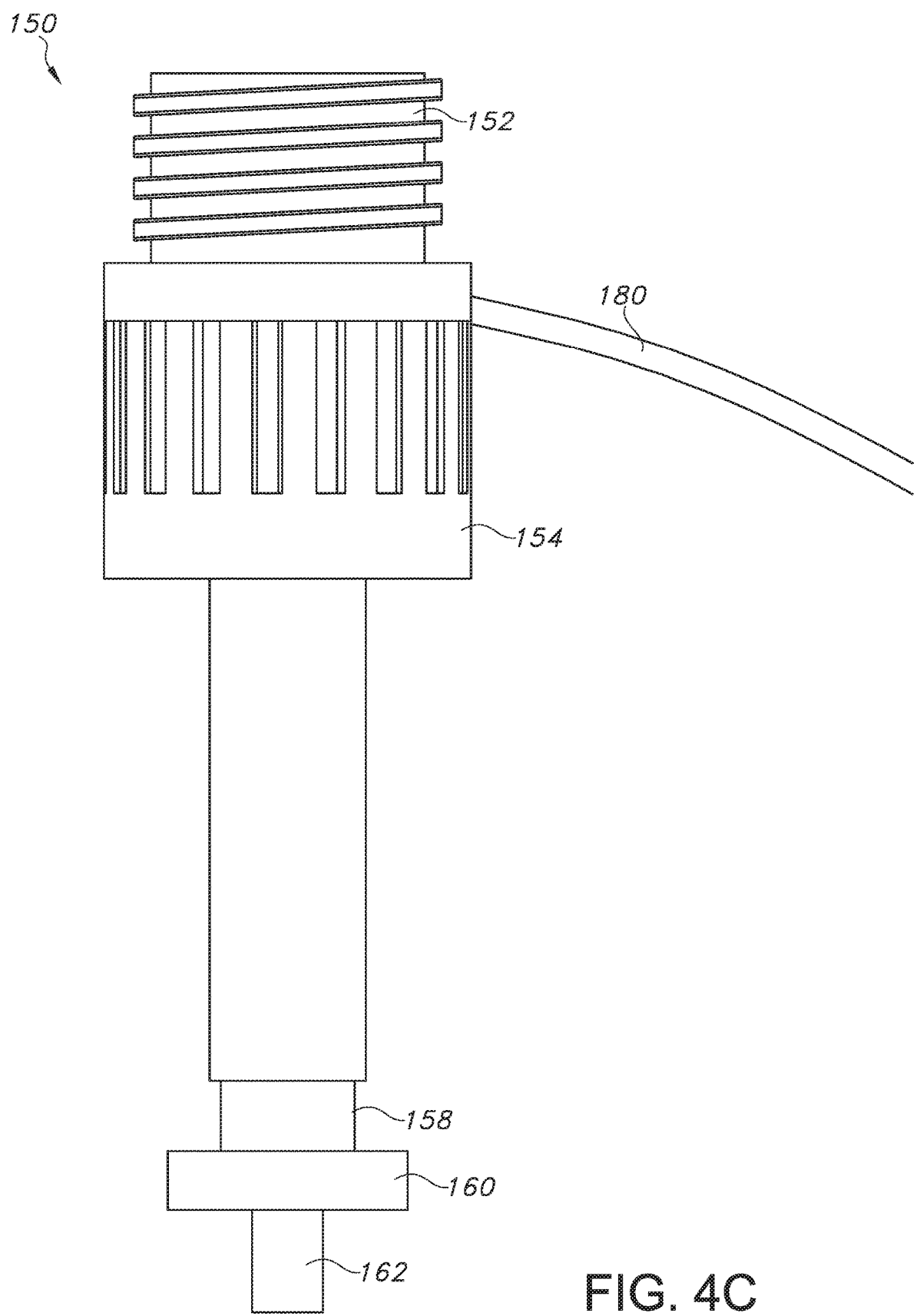
FIG. 4C illustrates an isometric front view of the dummy battery insert shown in FIG. 4A, wherein the conductive cable has also been illustrated.
Figure 5:
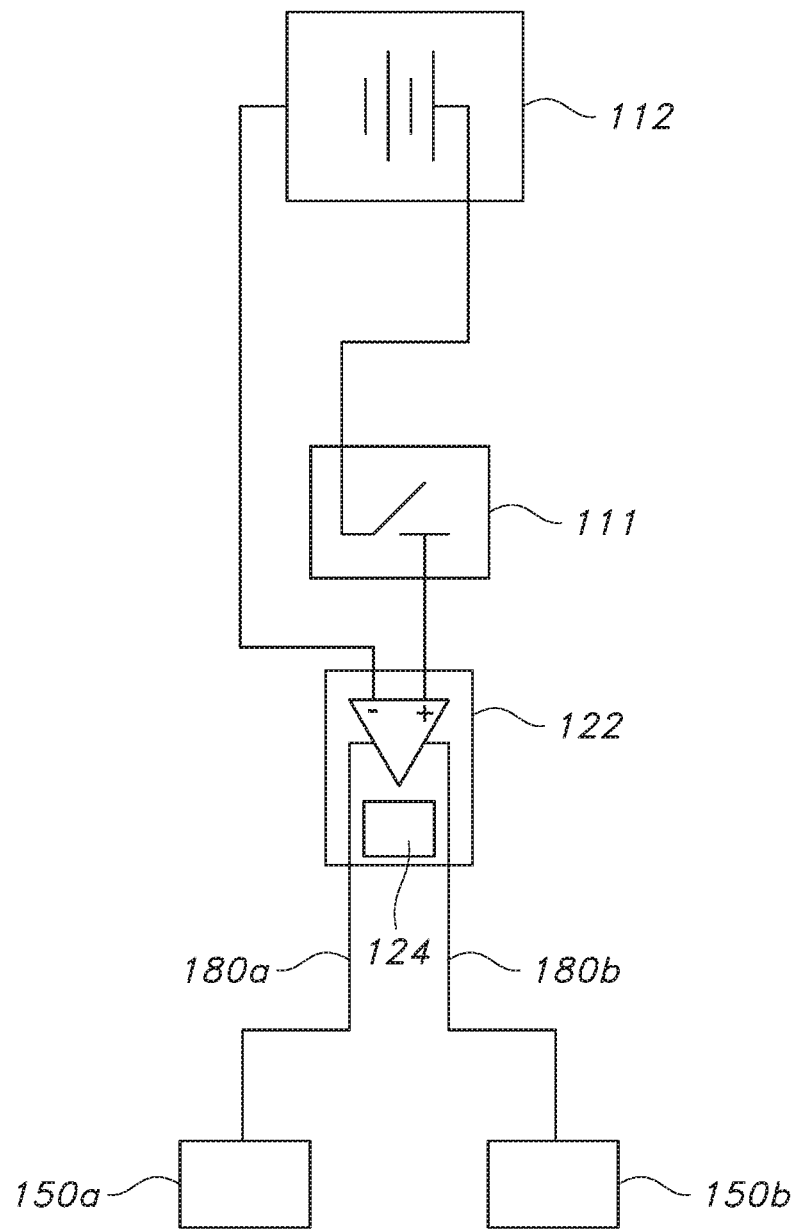
FIG. 5 illustrates an example electronic circuit, used to power night vision monoculars conductively connected to the binocular bridge system by the dummy battery inserts, according to the principles of the present disclosure.

As shown in FIGS. 4A-4C, in some implementations, each dummy battery insert 150*a*, 150*b* may comprise a top cap 152, a rotating cap 154, a negative contact 156, a cylindrical shaft 158, an alignment washer 160, and/or a positive contact 162. In some implementations, a first end of a conductive cable 180*a*, 180*b* may be positioned within a dummy battery insert 150*a*, 150*b* and a first wire thereof conductively connected to the negative contact 156 and a second wire thereof conductively connected to the positive contact 156. In this way, an electrical cable 180*a*, 180*b* may be used to conductively connect a dummy battery insert 150*a*, 150*b*, and thereby a night vision monocular 104*a*, 104*b*, to the master control switch 111, the battery storage compartment 112, and/or the PCB 122 of the binocular bridge system 100.

As shown in FIGS. 4A-4C, in some implementations, the distal end of the top cap 152 may be configured (i.e., threaded) so that the factory battery cap of a night vision monocular 104*a*, 104*b* may be threadedly secured thereon. In this way, the factory battery cap may be retained. In some implementations, the top cap 152 may comprise a guide groove 152*a* through which a conductive cable 180*a*, 180*b* extends (see, e.g., FIG. 1C). In some implementations, the guide groove 152*a* in the top cap 152 may extend through a portion of the base member 152*b* thereof (see, e.g., FIG. 4B).

As shown in FIGS. 4A and 4B, in some implementations, the rotating cap 154 may be rotatably positioned between the top cap 152 and the negative contact 156 of a dummy battery insert 150*a*, 150*b*. In some implementations, the rotating cap 154 may be configured to threadedly attach to the battery compartment of a night vision monocular device 104*a*, 104*b* (see, e.g., FIG. 1C). In some implementations, the rotating cap 154 may include a central opening 154*a* that extends therethrough.

As shown in FIG. 4B, in some implementations, the cylindrical shaft 158 may comprise a first end having an annular shoulder 164 thereon, a longitudinally extending channel 166, and/or a longitudinally extending central bore. In some implementations, when a dummy battery insert 150*a*, 150*b* is assembled, a portion of the first wire that is secured to the negative contact 156 may be nested within the longitudinally extending channel 166 of the cylindrical shaft 158. In some implementations, a portion of heat-shrink tubing may be used to insulate the first wire nested in the channel 166 of the cylindrical shaft 158 (see, e.g., FIG. 4C).

As shown in FIG. 4B, in some implementations, the negative contact 156 may comprise a generally circular base 156*a* having a cylindrical boss 156*b* extending upwardly therefrom, and a central opening 156*c* that extends therethrough. In some implementations, the circular base 156*a* of the negative contact 156 may be larger in diameter than the cylindrical boss 156*b* thereof. In some implementations, the cylindrical boss 156*b* may be smaller in diameter than the central opening 154*a* that extends through the rotating cap 154. In this way, the rotating cap 154 is able to rotate about the cylindrical boss 156*b* of the negative contact 156. In some implementations, the negative contact 156 may be fabricated from nickel plated aluminum. In some implementations, the negative contact 156 may be fabricated from any material, or combination of materials, suitable for use as an electrical contact.

In some implementations, the alignment washer 160 may be configured to centrally position a dummy battery insert 150*a*, 150*b* within the battery compartment of a night vision monocular 104*a*, 104*b*. In this way, the positive contact 162 of a dummy battery insert 150*a*, 150*b* remains in conductive contact with the positive contact of the battery compartment into which it has been positioned.

As shown in FIG. 4B, in some implementations, the positive contact 162 may comprise a circular base 162*a* having a cylindrical shaft 162*b* extending therefrom. In some implementations, the circular base 162*a* of the positive contact 162 may be larger in diameter than the cylindrical shaft 162*b* thereof. In some implementations, the positive contact 162 may be fabricated from nickel plated aluminum. In some implementations, the positive contact 162 may be fabricated from any material, or combination of materials, suitable for use as an electrical contact.

In some implementations, once a first end of a conductive cable 180*a*, 180*b* has been positioned within the central bore 168 of the cylindrical shaft 158 and a conductive wire thereof secured (e.g., soldered) to both the positive contact 162 and the negative contact 156, the following steps may be used to assemble a dummy battery insert 150*a*, 150*b*:

Initially, insert the first end of the cylindrical shaft 158 into the opening 156*c* extending through the negative contact 156 so that the circular base 156*a* thereof comes to rest on the shoulder 164 of the cylindrical shaft 158.

Then, in some implementations, position the rotating cap 154 over the negative contact 156 so that the cylindrical boss 156*b* thereof extends through the opening 154*a* in the rotating cap 154.

Next, in some implementations, position the top cap 152 over the rotating cap 154 so that the two fastener channels 153*a*, 153*b* thereof are aligned with the threaded openings in the negative contact 156.

Then, in some implementations, insert one fastener into each fastener channel 153*a*, 153*b* extending through the top cap 152 and threadedly secured it within the aligned threaded opening in the negative contact 156. In some implementations, when assembled, the top cap 152 and the negative contact 156 do not impinge on the rotation of the rotating cap 154. In this way, the rotating cap 154 may be used to secure a dummy battery insert 150*a*, 150*b* within the battery compartment of a night vision monocular 104*a*, 104*b* without placing torque on the conductive cable 180*a*, 180*b* extending through the guide groove 152*a* in the top cap 152.

Next, in some implementations, insert the second end of the cylindrical shaft 158 into the central opening 160*a* extending through the alignment washer 160 (see, e.g., FIG. 4A).

Then, in some implementations, insert the cylindrical shaft 162*b* of the positive contact 162 into the opening of the central bore 168 in the second end of the cylindrical shaft 158 of a dummy battery insert 150*a*, 150*b*. In this way, the positive contact 162 may be secured to the cylindrical shaft 158 (see, e.g., FIG. 4A).

As shown in FIGS. 1C, 1D, and 3, in some implementations, the bridge 110 of the binocular bridge system 100 may further comprise a connector socket 170 (e.g., a LEMO connector) configured to interface with the connector plug (e.g., a LEMO connector) of the cable extending from a remotely positioned power source (e.g., a battery pack). In some implementations, the connector socket 170 may be configured to conductively connect the remotely positioned power source to the master control switch 111 and/or the PCB 122 of the binocular bridge system 100. In this way, a power source other than what is housed in the battery storage compartment 112 of the bridge 110 may be used to power the night vision monoculars 104*a*, 104*b* conductively connected to the binocular bridge system 100.

In some implementations, the binocular bridge system 100 may not include a connector socket 170.

In some implementations, the connector socket 170 may be positioned within a bore extending through an extension 172 of the bridge 110. In some implementations, a portion of the connector socket 170 may extend from a first end of the bore and a cover 174 may be used to seal the second end of the bore (see, e.g., FIGS. 1C and 1D).

In some implementations, once the first night vision monocular 104a and the second night vision monocular 104b have been secured to the first hinged arm 130 and the second hinged arm 140, respectively, of the bridge 110 and the first dummy battery cell 150a and the second dummy battery cell 150b have been secured in position within the battery compartment of the first night vision monocular 104a and the second night vision monocular 104b, respectively, the power switch of each night vision monocular 104a, 104b should be turned to the "on" position. In this way, the master control switch 111 is able to selectively energize (i.e., power) both night vision monoculars 104a, 104b simultaneously. Succinctly put, placing the power switch of both night vision monoculars 104a, 104b in the "on" position closes their internal circuits thereby allowing the master control switch 111 to simultaneously remove or restore the conductive path between a power source (e.g., a battery stored in the bridge 110 or a remotely positioned battery pack) and both night vision monoculars 104a, 104b.

Although not shown in the drawings, it will be understood that suitable wiring connects the electrical components (e.g., the master control switch 111, the battery storage compartment 112, the PCB 122, the first dummy battery insert 150a, the second dummy battery insert 150b, and/or the connector socket 170) of the binocular bridge system 100 disclosed herein.

In some implementations, the bridge 110 and/or the interface shoe 113 may be fabricated from polyoxymethylene (POM). In some implementations, the bridge 110 and/or the interface shoe 113 may be fabricated from any material (e.g., aluminum), or combination of materials, suitable for use as part of a binocular bridge system 100.

In some implementations, the hinged arms 130, 140, the objective alignment rings 132, 142, and/or the pivot pins 131, 141 may be fabricated from aluminum. In some implementations, the hinged arms 130, 140, the objective alignment rings 132, 142, and/or the pivot pins 131, 141 may be fabricated from any material, or combination of materials, suitable for use as parts of a binocular bridge system 100.

It is important to note that, in some implementations, no permanent modification need be made to a night vision monocular 104a, 104b in order to use it in conjunction with a binocular bridge system 100 constructed in accordance with the present disclosure.

As shown in FIGS. 1C and 1D, the night vision monoculars 104a, 104b used in conjunction with the binocular bridge system 100 are AN/PVS-14s. It should be understood that, in some implementations, other commercially available night vision monoculars may be used in conjunction with the binocular bridge system 100. Also, in some implementations, the hinged arms 130, 140 and/or the dummy battery inserts 150a, 150b may be configured to work with other commercially available night vision monoculars.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. A binocular bridge system configured to couple two night vision monoculars together, the binocular bridge system comprising:
   a bridge;
   a power source housed with in the bridge;
   a first hinged arm, a proximal end of the first hinged arm is secured to a first side of the bridge, the first hinged arm includes an objective alignment ring configured to fit around an objective lens locking ring of a first night vision monocular secured to the first hinged arm;
   a second hinged arm, a proximal end of the second hinged arm is secured to a second side of the bridge, the second hinged arm includes an objective alignment ring configured to fit around an objective lens locking ring of a second night vision monocular secured to the second hinged arm;
   a first dummy battery insert configured to be positioned within the battery compartment of the first night vision monocular and conductively connect it to the power source housed within the bridge, the first dummy battery insert comprising an elongate shaft, a negative contact that encircles a portion of the elongate shaft, a positive contact located at an end of the elongate shaft, and a rotating cap configured to threadedly secure the first dummy battery insert to the battery compartment of the first night vision monocular; and
   a second dummy battery insert configured to be positioned within a battery compartment of the second night vision monocular and conductively connect it to the power source housed within the bridge, the second dummy battery insert comprising an elongate shaft, a negative contact that encircles a portion of the elongate shaft, a positive contact located at an end of the elongate shaft, and a rotating cap configured to threadedly secure the second dummy battery insert to the battery compartment of the second night vision monocular;
   wherein the objective alignment rings of the first hinged arm and the second hinged arm are configured to mechanically collimate the night vision monoculars secured to the first hinged arm and the second hinged arm of the binocular bridge system.

2. The binocular bridge system of claim 1, wherein the second hinged arm is configured to contour about the second night vision monocular.

3. The binocular bridge system of claim 1, wherein the first hinged arm and the second hinged arm each include an opening near a distal end thereof for a threaded fastener to extend therethrough, the threaded fastener extending through the opening in the first hinged arm is used to secure the first night vision monocular thereto and the threaded fastener extending through the opening in the second hinged arm is used to secure the second night vision monocular thereto.

4. The binocular bridge system of claim 1, wherein the bridge comprises a master control switch configured to act as an on/off switch for the first night vision monocular and the second night vision monocular.

5. The binocular bridge system of claim 4, wherein the bridge further comprises a printed circuit board that is enclosed within an interior compartment thereof, the printed circuit board comprises a voltage divider configured to provide an output voltage to any night vision monocular conductively connected thereto by the first dummy battery insert or the second dummy battery insert.

6. The binocular bridge system of claim 4, wherein the bridge further comprises a connector socket configured to interface with a connector plug of a cable extending from a remotely positioned power source, the connector socket is conductively connected to the first dummy battery insert and the second dummy battery insert.

7. The binocular bridge system of claim 1, wherein the first dummy battery insert further comprises an alignment washer that encircles a portion of the elongate shaft adjacent the positive contact, the alignment washer is configured to centrally position the first dummy battery insert within the battery compartment of the first night vision monocular; the second dummy battery insert further comprises an alignment washer that encircles a portion of the elongate shaft adjacent the positive contact, the alignment washer is configured to centrally position the second dummy battery insert within the battery compartment of the second night vision monocular.

8. The binocular bridge system of claim 1, wherein the elongate shaft of the first dummy battery insert includes an annular shoulder on which rest the negative contact; the elongate shaft of the second dummy battery insert includes an annular shoulder on which rest the negative contact.

9. The binocular bridge system of claim 8, wherein the negative contact of the first dummy battery insert includes a circular base and a cylindrical boss that extends from the circular base, the circular base rest on the annular shoulder of the elongate shaft and the cylindrical boss extends through an opening in the rotating cap; wherein the negative contact of the second dummy battery insert includes a circular base and a cylindrical boss that extends from the circular base, the circular base rest on the annular shoulder of the elongate shaft and the cylindrical boss extends through an opening in the rotating cap.

10. A binocular bridge system configured to couple two night vision monoculars together, the binocular bridge system comprising:
a bridge;
a power source housed within the bridge;
a first hinged arm, a proximal end of the first hinged arm is secured to a first side of the bridge;
a second hinged arm, a proximal end of the second hinged arm is secured to a second side of the bridge;
a first dummy battery insert comprising an elongate shaft, a negative contact that encircles a portion of the elongate shaft, and a positive contact located at an end of the elongate shaft; and
a second dummy battery insert comprising an elongate shaft, a negative contact that encircles a portion of the elongate shaft, and a positive contact located at an end of the elongate shaft;
wherein the first dummy battery insert is configured to be positioned within a battery compartment of a night vision monocular secured to the first hinged arm and conductively connect it to the power source housed within the bridge; the second dummy battery insert is configured to be positioned within a battery compartment of a night vision monocular secured to the second hinged arm and conductively connect it to the power source housed within the bridge.

11. The binocular bridge system of claim 10, wherein the bridge comprises a master control switch configured to act as an on/off switch for the pair of night vision monoculars conductively connected thereto by the first dummy battery insert and the second dummy battery insert.

12. The binocular bridge system of claim 11, wherein the bridge further comprises a printed circuit board that is enclosed within an interior compartment thereof, the printed circuit board comprises a voltage divider configured to provide an output voltage to any night vision monocular conductively connected thereto by the first dummy battery insert or the second dummy battery insert.

13. The binocular bridge system of claim 11, wherein the bridge further comprises a connector socket configured to interface with a connector plug of a cable extending from a remotely positioned battery pack, the connector socket is conductively connected to the first dummy battery insert and the second dummy battery insert.

14. The binocular bridge system of claim 11, wherein the first dummy battery insert further comprises an alignment washer that encircles a portion of the elongate shaft adjacent the positive contact, the alignment washer is configured to centrally position the first dummy battery insert within the battery compartment of the night vision monocular secured to the first hinged arm; the second dummy battery insert further comprises an alignment washer that encircles a portion of the elongate shaft adjacent the positive contact, the alignment washer is configured to centrally position the second dummy battery insert within the battery compartment of the night vision monocular secured to the second hinged arm.

15. The binocular bridge system of claim 10, wherein the second hinged arm is configured to contour about the night vision monocular secured thereto.

16. The binocular bridge system of claim 10, wherein the first hinged arm and the second hinged arm each include an opening near a distal end thereof for a threaded fastener to extend therethrough, the threaded fastener extending through the opening in the first hinged arm is used to secure the night vision monocular thereto and the threaded fastener extending through the opening in the second hinged arm is used to secure the night vision monocular thereto.

17. The binocular bridge system of claim 10, wherein the elongate shaft of the first dummy battery insert includes an annular shoulder on which rest the negative contact; the elongate shaft of the second dummy battery insert includes an annular shoulder on which rest the negative contact.

18. The binocular bridge system of claim 17, wherein the negative contact of the first dummy battery insert includes a base and a cylindrical boss that extends from the base, the base of the negative contact rest on the annular shoulder of the elongate shaft; wherein the negative contact of the second dummy battery insert includes a base and a cylindrical boss that extends from the base, the base of the negative contact rest on the annular shoulder of the elongate shaft.

\* \* \* \* \*